(12) United States Patent
Honda et al.

(10) Patent No.: US 11,866,550 B2
(45) Date of Patent: Jan. 9, 2024

(54) FLUOROPOLYETHER COMPOUND, LUBRICANT, AND MAGNETIC DISK

(71) Applicant: Moresco Corporation, Kobe (JP)

(72) Inventors: Tomoko Honda, Kobe (JP); Ryosuke Sagata, Kobe (JP)

(73) Assignee: Moresco Corporation, Kobe (JP)

( * ) Notice: Subject to any disclaimer, the term of this patent is extended or adjusted under 35 U.S.C. 154(b) by 0 days.

(21) Appl. No.: 17/863,602

(22) Filed: Jul. 13, 2022

(65) Prior Publication Data

US 2023/0038701 A1    Feb. 9, 2023

(30) Foreign Application Priority Data

Jul. 16, 2021 (JP) .................. 2021-118153

(51) Int. Cl.
| | |
|---|---|
| *C08G 65/00* | (2006.01) |
| *C10M 107/38* | (2006.01) |
| *G11B 5/725* | (2006.01) |
| *C10M 177/00* | (2006.01) |

(52) U.S. Cl.
CPC ......... *C08G 65/007* (2013.01); *C10M 107/38* (2013.01); *C10M 177/00* (2013.01); *G11B 5/7257* (2020.08); *C10M 2213/0606* (2013.01)

(58) Field of Classification Search
CPC .. C08G 65/007; G11B 5/7257; C10M 107/38; C10M 2213/0606
See application file for complete search history.

(56) References Cited

U.S. PATENT DOCUMENTS

| | | |
|---|---|---|
| 2012/0127599 A1 | 5/2012 | Shimokawa et al. |
| 2016/0055874 A1 | 2/2016 | Shimokawa et al. |
| 2018/0268853 A1 | 9/2018 | Shimokawa et al. |
| 2020/0010619 A1* | 1/2020 | Minami ............... C08G 65/331 |

FOREIGN PATENT DOCUMENTS

WO    WO-2010038773 A1    4/2010

* cited by examiner

*Primary Examiner* — Holly Rickman
(74) *Attorney, Agent, or Firm* — Harness Dickey & Pierce P.L.C.

(57) ABSTRACT

Provided are a fluoropolyether compound having high heat resistance and capable of maintaining a surface protection layer even under high temperature, and a lubricant and a magnetic disk that contain the fluoropolyether compound. The fluoropolyether compound includes: three groups whose main chain contains a perfluoropolyether chain; and a trivalent linking group represented by Formula (1) below, the three groups being bound together via the trivalent linking group:

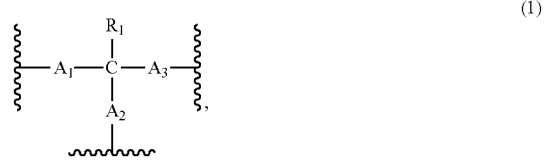

(1)

where $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, and $A_1$, $A_2$, and $A_3$ are each independently an aromatic group.

4 Claims, 6 Drawing Sheets

| | |
|---|---|
| 6 | (chemical structure) |
| A-2-3 | (chemical structure) |
| A-2-4 | (chemical structure) |

FLUOROPOLYETHER COMPOUND, LUBRICANT, AND MAGNETIC DISK

PRIORITY STATEMENT

This Nonprovisional application claims priority under 35 U.S.C. § 119 on Patent Application No. 2021-118153 filed in Japan on Jul. 16, 2021, the entire contents of which are hereby incorporated by reference.

TECHNICAL FIELD

The present invention relates to a fluoropolyether compound, a lubricant, and a magnetic disk.

BACKGROUND ART

For the purpose of increasing the storage capacity of magnetic disks including a hard disk drive (HDD), the development of magnetic disks based on energy assisted technology such as heat-assisted magnetic recording (HAMR) technology is in progress.

For magnetic disks based on energy assisted technology, the magnetism of the magnetic disk is controlled by applying, to a magnetic layer, energy through a laser beam, a microwave, or the like, and the energy heats the magnetic layer.

A surface lubricant for a magnetic disk is applied on the outermost surface of a magnetic disk for surface protection. In a case of a magnetic disk based on energy assisted technology, such a surface lubricant for a magnetic disk is also exposed to high temperature. Accordingly, there is demand for a high heat-resistance lubricant capable of maintaining a surface protection layer even under high temperature.

There are techniques (for example, Patent Literature 1) of increasing a molecular weight through multimerization (multidentate structure) known as a technique for improving the heat resistance of the lubricant.

CITATION LIST

Patent Literature

[Patent Literature 1]
International Publication No. WO 2010/038773

SUMMARY OF INVENTION

Technical Problem

However, the conventional techniques as described above still have room for improvement from the viewpoint of heat resistance.

The object of an aspect of the present invention is to provide a fluoropolyether compound excellent in heat resistance and capable of maintaining a surface protection layer even under high temperature, and a lubricant and a magnetic disk that contain the fluoropolyether compound.

Solution to Problem

As a result of diligently conducting a series of studies to attain the above object, the inventors of the present invention found that a fluoropolyether compound containing a particular structure has high heat-resistance and is capable of maintaining a surface protection layer even under high temperature, and eventually completed the present invention. Specifically, the present invention includes the following aspects.

A fluoropolyether compound including: three groups whose main chain contains a perfluoropolyether chain; and a trivalent linking group represented by Formula (1) below, the three groups being bound together via the trivalent linking group.

(1)

In Formula (1), $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, and $A_1$, $A_2$, and $A_3$ are each independently an aromatic group.

Advantageous Effects of Invention

An aspect of the present invention makes it possible to provide a fluoropolyether compound excellent in heat resistance and capable of maintaining a surface protection layer even under high temperature, and a lubricant and a magnetic disk that contain the fluoropolyether compound.

DESCRIPTION OF EMBODIMENTS

1. Fluoropolyether Compound

During the diligent studies to attain the above object, the inventors of the present invention focused on a lubricant compound including a plurality of perfluoropolyether groups bound together via a trivalent linking group, disclosed in Patent Literature 1, having a structure in which three benzene rings and one hydrogen atom are bound to a carbon atom.

The conventional idea is that, when used in a magnetic disk, the lubricant compound including multiple perfluoropolyether groups bound via a linking group having a structure in which a hydrogen atom is bound to a tertiary carbon atom adjacent to benzene rings is stable. However, the inventors of the present invention found, through a heat resistance test performed on such a lubricant compound, that a low-molecular-weight by-product was produced by molecular cleavage and the by-product ended up vaporizing. The reason why the low-molecular-weight by-product was produced can be considered as follow: Heating caused elimination of the hydrogen having been bound to the tertiary carbon atom adjacent to benzene rings and therefore caused a change in the structure. This resulted in the cleavage of a linkage between the tertiary carbon atom and the benzene ring, so that a low-molecular-weight by-product was produced. When a low-molecular-weight by-product is produced due to such molecular cleavage on a magnetic disk, the by-product ends up vaporizing. This makes it difficult to maintain a lubricating film.

Typically, a linking group in which hydrogen atom, which is not bulky, is bound to a tertiary carbon atom adjacent to benzene rings is used because a bulky linking group becomes a hindrance when used in a magnetic disk. The inventors of the present invention however found that when a linking group having a structure in which an alkyl group is bound to a tertiary carbon atom adjacent to benzene rings was used, even an alkyl group having, for example, 1 to 3 carbon atoms, which is bulkier than a hydrogen atom, did not become an impediment and it is possible to provide a lubricant excellent in chemical stability and capable of maintaining a lubricating film even during heating of a disk using HAMR technology or the like. This was an unexpected effect.

A fluoropolyether compound in accordance with an embodiment of the present invention including three groups whose main chain contains a perfluoropolyether chain, the three groups being bound together via a trivalent linking group represented by Formula (1) below.

(1)

In Formula (1), $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, and $A_1$, $A_2$, and $A_3$ are each independently an aromatic group.

Examples of the saturated hydrocarbon group having 1 to 3 carbon atoms can include a methyl group, an ethyl group, a propyl group, and an isopropyl group. Examples of the perfluoroalkyl group having 1 to 3 carbon atoms can include a trifluoromethyl group, a perfluoroethyl group, a perfluoropropyl group, and a perfluoroisopropyl group. Examples of the alkoxy group having 1 to 3 carbon atoms can include a methoxy group, an ethoxy group, a propoxy group, and an isopropoxy group. Among the groups above, $R_1$ is preferably a group having a smaller molecular weight because the clearance between a magnetic disk and a magnetic head can be made smaller. In particular, $R_1$ is more preferably a methyl group because a methyl group has a small molecular weight and the materials thereof is easily available.

Examples of the aromatic group can include a phenylene group, a naphthylene group, a biphenyl group, and a diphenyl ether group. The aromatic group may contain a substituent. $A_1$, $A_2$, and $A_3$ may be the same or may be different from one another. In particular, $A_1$, $A_2$, and $A_3$ are more preferably phenylene groups because the clearance between a magnetic disk and a magnetic head can be made smaller.

A group whose main chain contains the perfluoropolyether chain is not limited to any particular group provided that the main chain of the group contains a perfluoropolyether chain. From the viewpoint of heat resistance, the group whose main chain contains the perfluoropolyether chain is more preferably a group having a hydroxyl group, an aromatic group, and a combination thereof, in a terminal part thereof, i.e., a terminal part opposite to a part at which the group is bound to the linking group. Examples of the aromatic group include a phenyl group, a naphthyl group, a phenoxyphenyl group, and a thienyl group. The aromatic group may be substituted by, for example, an alkoxy group having 1 to 4 carbon atoms, an amino group, a hydroxyl group, a hydroxyalkoxy group having 1 to 6 carbon atoms, or an amide group. In a case where the group whose main chain contains the perfluoropolyether chain contains a hydroxyl group in the terminal part, the number of the hydroxyl groups contained may be one, two, three, or four. Further, the group whose main chain contains the perfluoropolyether chain can contain any combination of the above-described aromatic group and a hydroxyl group. As used herein, the term "terminal part" is intended to contain (i) a terminal of a group whose main chain contains the perfluoropolyether chain and (ii) a part which is closer to the terminal than is the perfluoropolyether chain.

Figure 3:
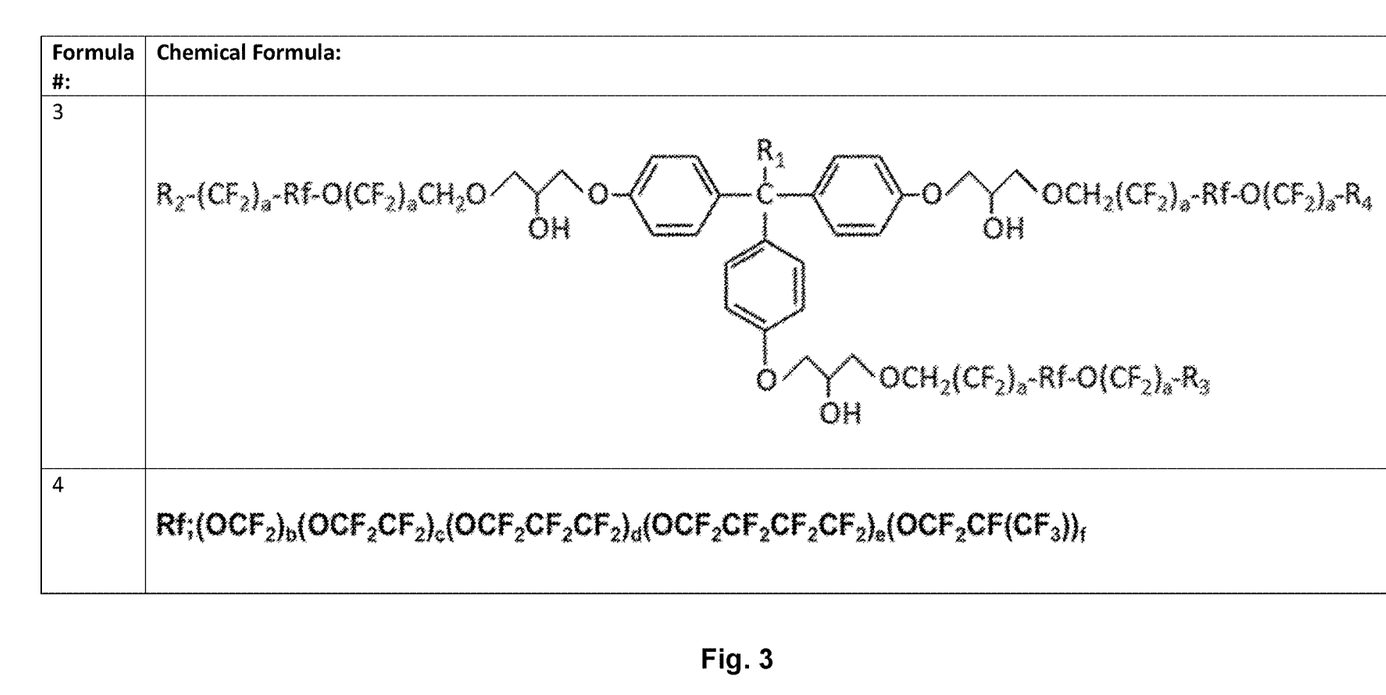
FIG. 3 is a table containing chemical formulas (3)-(4).

The perfluoropolyether chain is not limited to any particular chain. More preferable examples of the perfluoropolyether chain can include Rf represented by Formula (4) as shown in FIG. 3, which will be described later.

The three groups whose main chain contains the perfluoropolyether chain may be the same or may be different from one another.

The linking group can be a trivalent linking group represented by Formula (2) below.

(2)

In Formula (2), $A_1$, $A_2$, and $A_3$ are as described above, and $B_1$, $B_2$, and $B_3$ are each independently an aliphatic group having an ether linkage(s). Examples of the aliphatic group having an ether linkage(s) can include a group containing a linear or branched carbon backbone chain and having one or more ether linkages in the carbon backbone chain. The number of carbon atoms of the carbon backbone chain is not limited to any particular number. The number of the ether linkages is not limited to any particular number provided that the number is not less than 1.

The aliphatic group having an ether linkage(s) may contain a polar group. Examples of the polar group include an aromatic group, a hydroxyl group, an amino group, an aldehyde group, a carboxyl group, a thiol group, and a sulfonic acid group.

A fluoropolyether compound in accordance with an embodiment of the present invention can be, for example, a fluoropolyether compound represented by Formula (3) as shown in FIG. 3.

In Formula (3), shown in FIG. 3, $R_1$ is the same as $R_1$ in Formula (1) described above. In Formula (3), shown in FIG. 3, each $—(CF_2)_a—$ is independently a linear or branched perfluoroalkylene group, and each a is independently a real number of 1 to 3. Specifically, each $—(CF_2)_a—$ can be independently $—CF_2—$, $—(CF_2)_2—$, $—(CF_2)_3—$, or $—CF(CF_3)—$.

In Formula (3), shown in FIG. 3, Rf is a group represented by Formula (4) as shown in FIG. 3.

In Formula (4), shown in FIG. 3, b, c, d, e, and f are independently real numbers of 0 to 21 in each Rf such that at least any one of b, c, d, e, and f is a real number of not less than 1.

Examples of the Rf include Demnum backbone (C3 backbone): $-(OCF_2CF_2CF_2)_d-$, Fomblin backbone (C1C2 backbone): $-(OCF_2)_b(OCF_2CF_2)_c-$, C2 backbone: $-(OCF_2CF_2)_c-$, C4 backbone: $-(OCF_2CF_2CF_2CF_2)_e-$, Krytox backbone: $-(OCF_2CF(CF_3))_f-$.

More preferable examples of the Rf can include a group in which b, c, d, e, and f in Formula (4), shown in FIG. 3, satisfy any of the following (i) to (v). Such a group is preferable because the following configurations make a molecular chain flatter.

(i) b=a real number of 2 to 10, c=a real number of 2 to 12, and d, e, and f=0.
(ii) c=a real number of 6 to 12, and b, d, e, and f=0.
(iii) d=a real number of 3 to 8, and b, c, e, and f=0.
(iv) e=a real number of 2 to 5, and b, c, d, and f=0.
(v) f=a real number of 3 to 8, and b, c, d, and e=0.

In Fomblin backbone, $OCF_2$ and $OCF_2CF_2$ can be repeated randomly.

In Formula (3), shown in FIGS. 3, $R_2$, $R_3$, and $R_4$ are each independently F, $CH_2OH$, $CH_2OCH_2CH(OH)CH_2OH$, $CH_2OCH_2CH(OH)CH_2OCH_2CH(OH)CH_2OH$, $CH_2O(CH_2)_gOH$, $CH_2OCH_2CH(OH)CH_2OC_6H_4OC_6H_5$, $CH_2OCH_2CH(OH)CH_2OC_{10}H_7$, $CH_2OCH_2CH(OH)CH_2OC_6H_4-R_6$, $CH_2OCH_2CH(OH)CH_2O(CH_2)_hOC_6H_4-O(CH_2)_hOH$, or $CH_2OCH_2CH(OH)CH_2(OCH_2CH_2)_iOC_6H_4(OCH_2CH_2)_iOH$, $R_5$ is hydrogen, or an alkoxy group having 1 to 4 carbon atoms, an amino group, a hydroxyl group, or an amide group, g and i are each independently a real number of 1 to 3, and each h is independently a real number of 1 to 6. Examples of the alkoxy group having 1 to 4 carbon atoms can include a methoxy group, an ethoxy group, a propoxy group, an isopropoxy group, an n-butoxy group, a tert-butoxy group, and a sec-butoxy group. $R_2$, $R_3$, and $R_4$ more preferably contain an aromatic group from the viewpoint of heat resistance, and more preferably contain more hydroxyl groups from the view point of adhesion to a magnetic disk.

The fluoropolyether compound represented by Formula (3), shown in FIG. 3, described above can contain any combination of a described above, $R_1$ described above, Rf represented by Formula (4), shown in FIG. 3, described above, and $R_2$, $R_3$, and $R_4$ described above.

Each of the three groups whose main chain contains perfluoropolyether chain in the fluoropolyether compound in accordance with an embodiment of the present invention has a number average molecular weight preferably of 200 to 5000 and more preferably of 800 to 1500. The number average molecular weight is a value measured by $^{19}$F-NMR with use of JNM-ECX400 available from JEOL Ltd. In the NMR measurement, a sample is used without being diluted. A known peak that indicates a part of the skeleton structure of fluoropolyether serves as a reference for a chemical shift.

The three groups whose main chain contains the perfluoropolyether chain are each a compound having a molecular weight distribution, and have a molecular weight distribution (PD), represented by weight average molecular weight/number average molecular weight, typically of 1.0 to 1.5, more preferably of 1.0 to 1.3, and even more preferably of 1.0 to 1.1. Note that this molecular weight distribution is a property value obtained with use of HPLC-8220GPC available from Tosoh Corporation in which used are a column (PLgel Mixed E) available from Polymer Laboratories, an HCFC-based substitute for CFCs as an eluent, and a non-functional perfluoropolyether as a reference substance.

Figure 4:
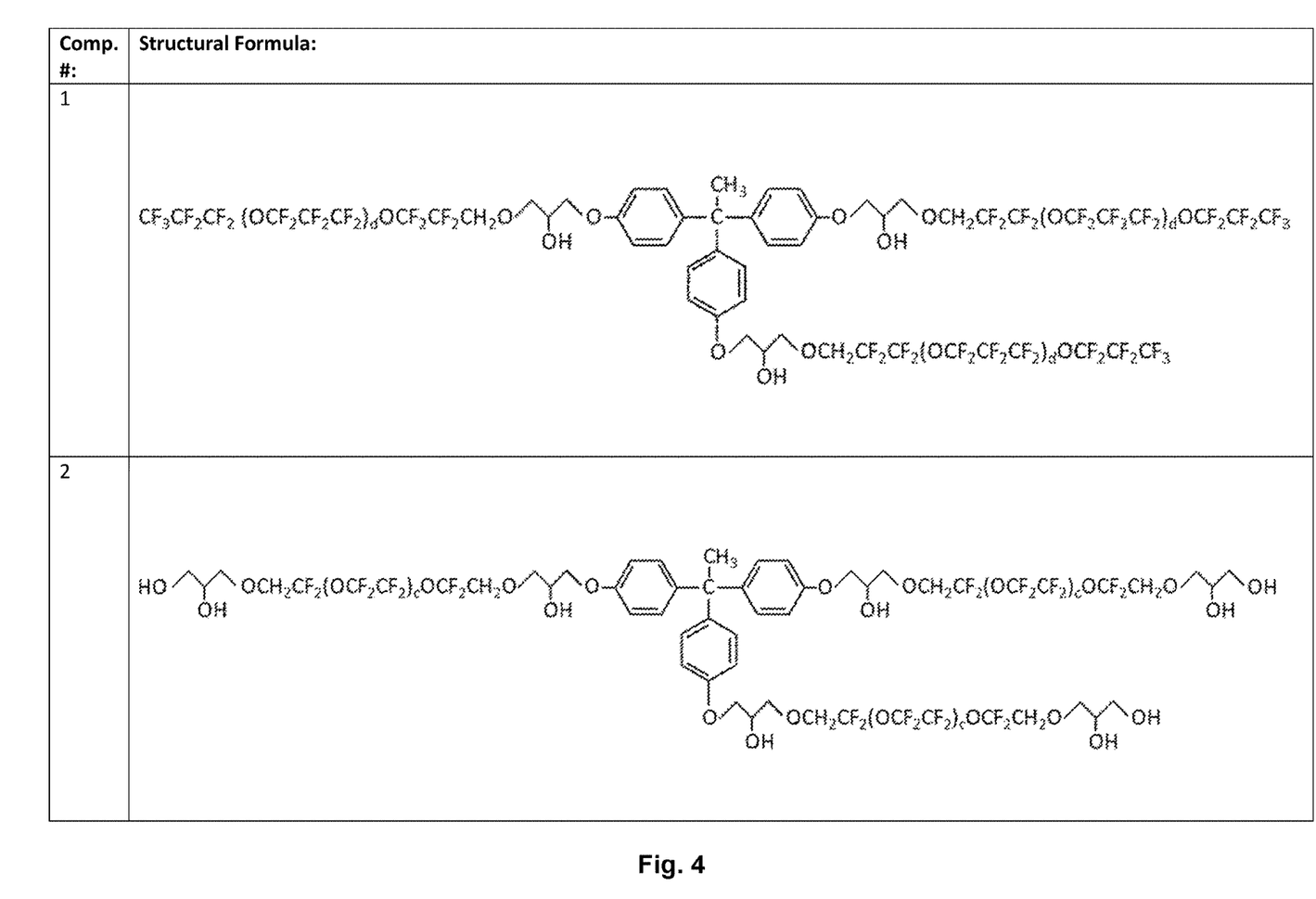
FIG. 4 is a table containing structural formulas for compounds 1-6, A-2-3, A-2-4, A-2-5, and A-2-6.

More specific examples of the fluoropolyether compound in accordance with an embodiment of the present invention can include a compound represented by compound 1 as shown in FIG. 4.

In compound 1, as shown in FIG. 4, d is a real number of 3 to 8.

In compound 2, as shown in FIG. 4, c is a real number of 6 to 12.

In compound 3, as shown in FIG. 4, d is a real number of 3 to 8.

In compound 4, as shown in FIG. 4, e is a real number of 2 to 5.

In compound 5, as shown in FIG. 4, c is a real number of 6 to 12.

In a compound 6, as shown in FIG. 4, c is a real number of 6 to 12.

The fluoropolyether compound in accordance with an embodiment of the present invention has good heat resistance. The fluoropolyether compound in accordance with an embodiment of the present invention exhibits a temperature, as of the point in time when the thermogravimetric weight is reduced by 10%, preferably of not less than 320° C. and more preferably not less than 330° C. The temperature is measured in the heat resistance evaluation (described later) by the thermogravimetric measurement.

2. Method for Producing Fluoropolyether Compound

A method for producing the fluoropolyether compound in accordance with an embodiment of the present invention is not limited to any particular method. The fluoropolyether compound in accordance with an embodiment of the present invention is obtained through, for example, a reaction between a linear fluoropolyether compound (which can hereinafter be referred to as "linear fluoropolyether compound (a)") whose main chain contains a perfluoropolyether chain and which has a hydroxyl group at at least one terminal thereof and a compound (which can hereinafter be referred to as "compound (A-1)") which contains a structure represented by Formula (1) above and which has a group containing an epoxide structure bound to each of $A_1$, $A_2$, and $A_3$ in Formula (1).

2-1. Linear Fluoropolyether Compound (a)

The linear fluoropolyether compound (a) whose main chain contains the perfluoropolyether chain described above and which has a hydroxyl group at at least one of the terminals thereof is not limited to any particular compound. Examples of the linear fluoropolyether compound (a) can include: a linear fluoropolyether compound (a-1) (which can hereinafter be referred to as "linear fluoropolyether compound (a-1)") which has a hydroxyl group at one terminal thereof and has F atoms at the other terminal; a linear fluoropolyether compound (a-2) (which can hereinafter be referred to as "linear fluoropolyether compound (a-2)") which has a hydroxyl group at one terminal thereof and has one, two, three, or four hydroxyl group(s) at the other terminal part; a linear fluoropolyether compound (a-3) (which can hereinafter be referred to as "linear fluoropolyether compound (a-3)") which has a hydroxyl group at one terminal thereof and has a hydroxyalkyl group at the other terminal; and a linear fluoropolyether compound (a-4) (which can hereinafter be referred to as "linear fluoropolyether compound (a-4)") which has a hydroxyl group at one terminal thereof and has an aromatic group and a hydroxyl group in the other terminal part. As used herein, the term "terminal part" is intended to contain (i) a terminal of a group whose main chain contains the perfluoropolyether chain and (ii) a part which is closer to the terminal than is the perfluoropolyether chain.

More specific examples of the linear fluoropolyether compound (a) can include a compound represented by Formula (5) below.

$$HO—CH_2(CF_2)_a—Rf—O(CF_2)_a—R \quad (5)$$

In Formula (5), each $—(CF_2)_a—$ is independently a linear or branched perfluoroalkylene group, each a is independently a real number of 1 to 3, and Rf is the same as Rf represented by Formula (4), shown in FIG. 3, described above. Further, in Formula (5), R is the same as $R_2$, $R_3$, and $R_4$ described above, and is F, $CH_2OH$, $CH_2OCH_2CH(OH)CH_2OH$, $CH_2OCH_2CH(OH)CH_2OCH_2CH(OH)CH_2OH$, $CH_2O(CH_2)_gOH$, $CH_2OCH_2CH(OH)CH_2OC_6H_4OC_6H_5$, $CH_2OCH_2CH(OH)CH_2OC_{10}H_7$, $CH_2OCH_2CH(OH)CH_2OC_6H_4—R_5$, $CH_2OCH_2CH(OH)CH_2O(CH_2)_hOC_6H_4—O(CH_2)_hOH$, or $CH_2OCH_2CH(OH)CH_2(OCH_2CH_2)_iOC_6H_4(OCH_2CH_2)_iOH$, $R_5$ is hydrogen, an alkoxy group having 1 to 4 carbon atoms, an amino group, a hydroxyl group, or an amide group, g and i are each independently a real number of 1 to 3, and each h is independently a real number of 1 to 6.

The linear fluoropolyether compound (a) represented by Formula (5) above can include any combination of a, R, and Rf described above.

Linear Fluoropolyether Compound (a-1)

Usable examples of the linear fluoropolyether compound (a-1) (e.g., a linear fluoropolyether compound (a-1) such that R is F in Formula (5)) include, but not limited to, compounds represented by the following formulas.

$$CF_3CF_2O(CF_2CF_2O)_cCF_2CH_2OH$$

$$CF_3CF_2CF_2O(CF_2CF_2CF_2O)_dCF_2CF_2CH_2OH$$

$$CF_3CF_2CF_2CF_2O(CF_2CF_2CF_2CF_2O)_e\\CF_2CF_2CF_2CH_2OH$$

Linear Fluoropolyether Compound (a-2)

The linear fluoropolyether compounds (a-2) described above include a linear fluoropolyether compound (which can hereinafter be referred to as "linear fluoropolyether (b)") that has a hydroxyl group at one terminal thereof and has one hydroxyl group at the other terminal. Suitably usable examples of the linear fluoropolyether (b) include a linear fluoropolyether compound (a-2) such that R is $CH_2OH$ in Formula (5), i.e., a linear fluoropolyether represented by $HOCH_2(CF_2)_a—Rf—O(CF_2)_a—CH_2OH$. In this formula, each $—(CF_2)_a—$ is independently a linear or branched perfluoroalkylene group, each a is independently a real number of 1 to 3, and Rf is the same as Rf represented by Formula (4), shown in FIG. 3, described above.

More specific usable examples of the linear fluoropolyether (b) can include compounds represented by the following formulas.

$$HOCH_2CF_2(OCF_2)_b(OCF_2CF_2)_cOCF_2CH_2OH$$

$$HOCH_2CF_2(OCF_2CF_2)_cOCF_2CH_2OH$$

$$HOCH_2CF_2CF_2(OCF_2CF_2CF_2)_dOCF_2CF_2CH_2OH$$

$$HOCH_2CF_2CF_2CF_2(OCF_2CF_2CF_2CF_2)_e\\OCF_2CF_2CF_2CH_2OH$$

$$HOCH_2CF(CF_3)(OCF_2CF(CF_3))_r—OCF_2CF_2\\(OCF_2CF(CF_3))_fO—CF(CF_3)CH_2OH.$$

The number average molecular weights of these kinds of linear fluoropolyether (b) are typically 200 to 5000, and more preferably 800 to 1500. These number average molecular weights are values measured by $^{19}F$-NMR with use of JNM-ECX400 available from JEOL Ltd. and in the same method as above.

The linear fluoropolyether (b) is a compound having a molecular weight distribution, and has a molecular weight distribution (PD), represented by weight average molecular weight/number average molecular weight, typically of 1.0 to 1.5, more preferably of 1.0 to 1.3, and even more preferably of 1.0 to 1.1. The molecular weight distribution is a value obtained by using HPLC-8220GPC available from Tosoh Corporation and in the same method as above.

The linear fluoropolyether compounds (a-2) described above includes a linear fluoropolyether compound (a-2) that has a hydroxyl group at one terminal thereof and has two, three, or four hydroxyl groups at the other terminal part (e.g., a linear fluoropolyether compound (a-2) such that R is $CH_2OCH_2CH(OH)CH_2OH$ or $CH_2OCH_2CH(OH)CH_2OCH_2CH(OH)CH_2OH$ in Formula (5)). Such a linear fluoropolyether compound (a-2) can be produced through a reaction between the linear fluoropolyether (b) described above having a hydroxyl group at both terminals thereof and a compound (c-1) (which can hereinafter be referred to as "compound (c-1)") that reacts with a hydroxyl group to form $—O—CH_2—CH(OH)—$. The reaction temperature is preferably 20° C. to 90° C. and more preferably 60° C. to 80° C. The reaction time is preferably 5 hours to 20 hours and more preferably 10 hours to 15 hours. The amount of the compound (c-1) to be used is preferably 0.5 equivalents to 1.5 equivalents with respect to the linear fluoropolyether (b). A reaction accelerator may be used in the reaction. Examples of the reaction accelerator can include sodium hydroxide, potassium t-butoxide, sodium t-butoxide, and sodium hydride. The reaction may be carried out in a solvent.

Examples of the solvent can include t-butyl alcohol, dimethyl formaldehyde, 1,4-dioxane, dimethyl sulfoxide, and dimethylacetamide. Subsequently, a reaction product thereby obtained may be purified by, for example, a column chromatography. In this manner, the linear fluoropolyether compound (a-2) having a hydroxyl group at one terminal thereof and having two, three, or four hydroxyl groups at the other terminal part can be obtained.

Examples of the compound (c-1) can include a compound containing an epoxide structure. Examples of the compound containing an epoxide structure can include glycidol, propylene oxide, glycidyl methyl ether, and isobutylene oxide.

For example, a reaction between $HOCH_2CF_2O(CF_2CF_2O)_cCF_2CH_2OH$ used as the linear fluoropolyether (b) and glycidol used as the compound (c-1) yields $HOCH_2CH(OH)CH_2OCH_2CF_2O(CF_2CF_2O)_cCF_2CH_2OH$ as the linear fluoropolyether compound (a).

Linear fluoropolyether compound (a-3) A linear fluoropolyether compound (a-3) having a hydroxyl group at one terminal thereof and having a hydroxyalkyl group at the other terminal (e.g., a linear fluoropolyether compound (a-3) such that R is $CH_2O(CH_2)_gOH$, where g is a real number of 1 to 3, in Formula (5)) can be produced through, for example, a reaction between the linear fluoropolyether (b) and haloalkyl alcohol (c-2) represented by $X(CH_2)_mOH$. In the haloalkyl alcohol (c-2) represented by $X(CH_2)_mOH$, X is the atom of a halogen such as chlorine, bromine, or iodine, and m is a real number preferably of 1 to 3.

More specific examples of the haloalkyl alcohol (c-2) can include 2-chloroethanol, 3-chloropropanol, 4-chlorobutanol, 5-chloropentanol, 6-chlorohexanol, 7-chloroheptanol, 8-chlorooctanol, 2-bromoethanol, 3-bromopropanol, 4-bromobutanol, 5-bromopentanol, 6-bromohexanol, 7-bromoheptanol, 8-bromooctanol, 2-iodoethanol, 3-iodopropanol, 4-iodobutanol, 5-iodopentanol, 6-iodohexanol, 7-iodoheptanol, and 8-iodooctanol.

Linear fluoropolyether compound (a-4) A linear fluoropolyether compound (a-4) having a hydroxyl group at one terminal thereof and having an aromatic group and a hydroxyl group at the other terminal part (e.g., a linear fluoropolyether compound (a-4) such that R is $CH_2OCH_2CH(OH)CH_2OC_6H_4OC_6H_5$, $CH_2OCH_2CH(OH)CH_2OC_{10}H_7$, $CH_2OCH_2CH(OH)CH_2OC_6H_4$—$R_5$, $CH_2OCH_2CH(OH)CH_2O(CH_2)_hOC_6H_4$—$O(CH_2)_hOH$, or $CH_2OCH_2CH(OH)CH_2(OCH_2CH_2)_iOC_6H_4(OCH_2CH_2)_i$ OH, where $R_5$ is hydrogen, an alkoxy group having 1 to 4 carbon atoms, an amino group, a hydroxyl group, or an amide group, each h is independently a real number of 1 to 6, and each i is independently a real number of 1 to 3, in Formula (5)) can be produced through, for example, a reaction between the linear fluoropolyether (b) and a phenoxy compound (c-3) containing an epoxide structure.

Examples of the phenoxy compound (c-3) containing an epoxide structure can include compounds represented by formulae (c-3-1), (c-3-2), (c-3-3), and (c-3-4) below.

2-2. Compound (A-1) which contains structure represented by Formula (1) above and which has group containing epoxide structure bound to each of $A_1$, $A_2$, and $A_3$ in Formula (1)

The compound (A-1) is obtained by partially epoxidizing the hydroxyl group in the molecule of a compound (A-2) (e.g., compounds (A-2-1) to (A-2-6) below).

(A-2-1): 1,1,1-Tris(4-hydroxyphenyl)ethane
(A-2-2): 1,1,1-Tris(4-hydroxyphenyl)propane
(A-2-3): P,P',P"-Triphenolaminomethane, as shown in FIG. 4
(A-2-4): Tris(4-hydroxyphenyl)methanol, as shown in FIG. 4
(A-2-5): 1,1,1-Tris(4-hydroxyphenyl)methylpropane, as shown in FIG. 4
(A-2-6): 1,1,1-Tris(4-hydroxyphenyl)butane, as shown in FIG. 4

For example, in a case where 1,1,1-Tris(4-hydroxyphenyl)ethane is used as the compound (A-2) and the hydroxyl group is epoxidized, 1,1,1-Tris(4-hydroxyphenyl)ethane triglycidyl ether (D-1) is produced as the compound (A-1). In a case where 1,1,1-Tris(4-hydroxyphenyl)propane used as the compound (A-2) and the hydroxyl group is epoxidized, 2,2',2'-[propylidynetris(4,1-phenyleneoxymethylene)]tris[oxirane](D-2) is produced as the compound (A-1).

For example, a reaction between $HOCH_2CF_2O(CF_2CF_2O)_cCF_2CH_2OH$ used as the linear fluoropolyether (b) and the compound (c-3-1) used as the compound (c-3) yields $CH_3OC_6H_4OCH_2CH(OH)CH_2OCH_2CF_2O(CF_2CF_2O)_cCF_2CH_2OH$ as the linear fluoropolyether compound (a).

The reaction between the linear fluoropolyether (b) and the phenoxy compound (c-3) containing an epoxide structure is the same as the reaction between the linear fluoropolyether (b) and the compound (c-1) in the reaction temperature, the reaction time, the amount of the phenoxy compound (c-3) containing an epoxide structure to be used, the reaction accelerator, the solvent, and the subsequent treatment.

2-3. Synthesis of fluoropolyether compound in accordance with an embodiment of the present invention A fluoropolyether compound in accordance with an embodiment of the present invention is obtained through, for example, a reaction between the linear fluoropolyether compound (a) described above and the compound (A-1) described above.

Specifically, for example, the linear fluoropolyether compound (a) described above is reacted with the compound (A-1) described above in the presence of a base. The reaction temperature is preferably 20° C. to 90° C. and more preferably 60° C. to 80° C. The reaction time is preferably 5 hours to 120 hours and more preferably 30 hours to 70 hours. The amount of the linear fluoropolyether compound (a) to be used and the amount of the base to be used are preferably 3 equivalents to 15 equivalents and 0.3 equivalents to 3.0 equivalents, respectively, with respect to the compound (A-1). Usable examples of the base include alkali compounds including sodium t-butoxide, potassium t-butoxide, sodium hydroxide, potassium hydroxide, and sodium hydride. The reaction may be carried out in a solvent. Usable examples of the solvent include t-butanol, toluene, xylen, and meta-xylene hexafluoride. Subsequently, a reaction product thereby obtained may be washed with water and dehydrated. In this manner, the fluoropolyether compound in accordance with an embodiment of the present invention is obtained.

3. Lubricant

A lubricant in accordance with an embodiment of the present invention contains the fluoropolyether compound in accordance the embodiment of the present invention. As the lubricant, the fluoropolyether compound above can be used alone, or the fluoropolyether compound and other component(s) may be used in combination at any mixture ratio to the extent that the performance of the lubricant is not impaired.

Examples of the other component(s) include: known lubricants for magnetic disks such as Fomblin (registered trademark), Zdol (available from Solvay Solexis), Ztetraol (available from Solvay Solexis), Demnum (registered trademark) (available from Daikin Industries, Ltd.), and Krytox (registered trademark) (available from Dupont); MORESCO PHOSFAROL A20H (available from MORESCO); and MORESCO PHOSFAROL D-40H (available from MORESCO).

The lubricant can be used as a lubricant for recording media, in order to improve the sliding properties of magnetic disks. The lubricant can also be used as a lubricant for a recording medium such as a magnetic tape in other recording devices, besides magnetic disks, that involve sliding between the recording medium and the head. The lubricant can be used as a lubricant not only for recording devices but also for devices having a part involving sliding.

4. Magnetic Disk

Figure 1:
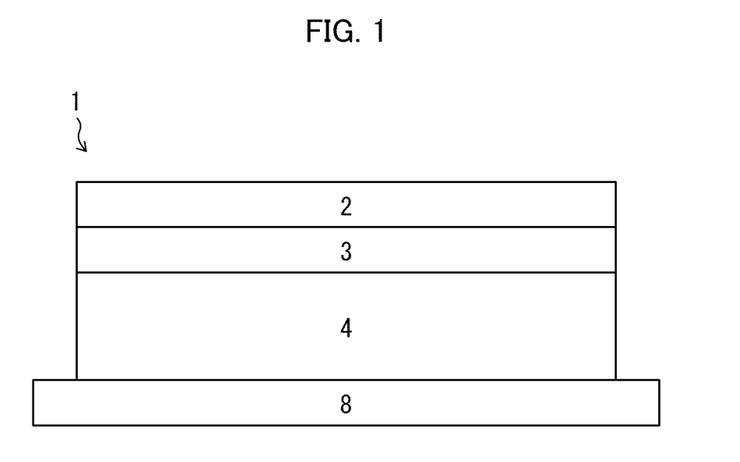
FIG. 1 is a cross-sectional view illustrating the configuration of a magnetic disk in accordance with an embodiment of the present invention.

As shown in FIG. 1, a magnetic disk 1 in accordance with an embodiment of the present invention includes a recording layer 4, a protective film layer (protective layer) 3, and a lubricant layer 2, which are disposed on a non-magnetic substrate 8. The lubricant layer 2 contains the above-described lubricant.

Figure 2:
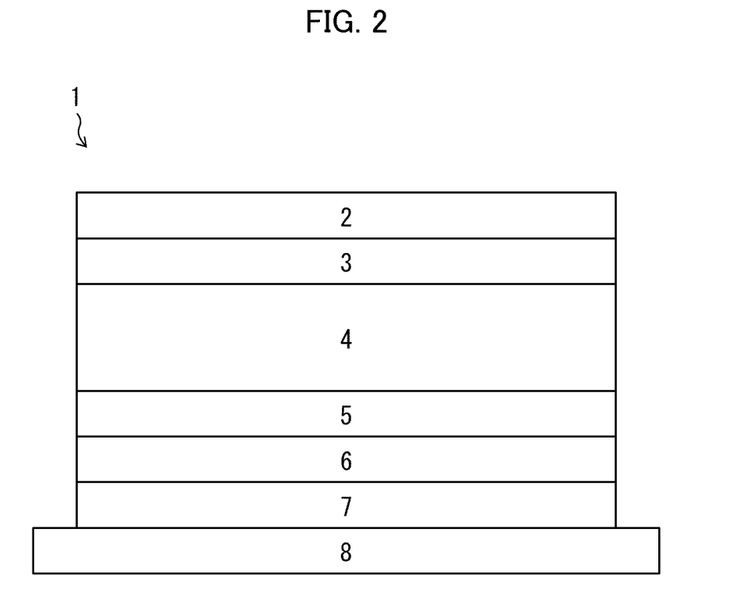
FIG. 2 is a cross-sectional view illustrating the configuration of a magnetic disk in accordance with an embodiment of the present invention.

In an embodiment, a magnetic disk can include, like a magnetic disk 1 illustrated in FIG. 2, a lower layer 5 that underlies the recording layer 4, one or more soft magnetic lower layers 6 that underlie the lower layer 5, and an adhesive layer 7 that underlies the one or more soft magnetic lower layers 6. In an embodiment, all these layers can be formed on the non-magnetic substrate 8.

The layers of the magnetic disk 1 except the lubricant layer 2 can each contain a material that is known in this technical field to be suitable for a corresponding layer of a magnetic disk. Examples of the material of the recording layer 4 include: an alloy of an element (e.g., iron, cobalt, and nickel) from which a ferromagnetic material can be formed and chromium, platinum, tantalum or the like; and an oxide of the alloy. Examples of the material of the protective layer 3 include carbon, $Si_3N_4$, SiC, and $SiO_2$. Examples of the material of the non-magnetic substrate 8 include an aluminum alloy, glass, and polycarbonate.

5. Method for Producing Magnetic Disk

A method, in accordance with an aspect of the present invention, for producing a magnetic disk includes a step of forming a lubricant layer by placing a lubricant in accordance with an embodiment of the present invention on an exposed surface of a protective layer of a stack of a recording layer and the protective layer.

There is no particular limitation on the method for forming the lubricant layer by placing the lubricant on the exposed surface of the protective layer of the stack of the recording layer and the protective layer. In order to place the lubricant on the exposed surface of the protective layer, it is preferable to dilute the lubricant with a solvent and then to place, on the exposed surface, the lubricant thus diluted. Examples of the solvent include: PF-5060, PF-5080, HFE-7100, and HFE-7200 each available from 3M; and Vertrel-XF (registered trademark) available from DuPont. The lubricant having been diluted with the solvent has a concentration preferably of 0.001 wt % to 1 wt %, more preferably of 0.005 wt % to 0.5 wt %, and even more preferably of 0.005 wt % to 0.1 wt %. When the concentration of the lubricant having been diluted with the solvent is 0.005 wt % to 0.1 wt %, it is possible to weaken the interaction among molecules of the lubricant and therefore facilitate formation of a uniform lubricating film.

After the recording layer and the protective layer are formed in this order and the lubricant is placed on the exposed surface of the protective layer, ultraviolet irradiation or heat treatment may be carried out.

The ultraviolet irradiation or heat treatment can form stronger bonds between the lubricant layer and the exposed surface of the protective layer and thereby prevent evaporation of the lubricant due to heating. In a case of carrying out ultraviolet irradiation, it is preferable to use an ultraviolet ray having a dominant wavelength of 185 nm or 254 nm. The heat treatment is carried out at a temperature preferably of 60° C. to 170° C., more preferably of 80° C. to 170° C., and even more preferably of 80° C. to 150° C.

6. Summation

An embodiment of the present invention includes the following configurations:

[1] A fluoropolyether compound including: three groups whose main chain contains a perfluoropolyether chain; and a trivalent linking group represented by Formula (1) below, the three groups being bound together via the trivalent linking group.

(1)

In Formula (1), $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, and $A_1$, $A_2$, and $A_3$ are each independently an aromatic group.

[2] The fluoropolyether compound described in [1] in which the linking group is a trivalent linking group represented by Formula (2) below.

(2)

In Formula (2), $B_1$, $B_2$, and $B_3$ each independently contain an aliphatic group having an ether linkage.

[3] The fluoropolyether compound described in [1] or [2] in which the fluoropolyether compound is represented by Formula (3) as shown in FIG. 3.

In Formula (3), shown in FIG. 3, $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, each $-(CF_2)_a-$ is independently a linear or branched perfluoroalkylene group, each a is independently a real number of 1 to 3, and Rf is represented by Formula (4) as shown in FIG. 3.

In Formula (4), shown in FIG. 3, b, c, d, e, and f are independently real numbers of 0 to 21 for each Rf, and at least any one of b, c, d, e, and f is a real number of not less than 1. $R_2$, $R_3$, and $R_4$ are each independently F, $CH_2OH$, $CH_2OCH_2CH(OH)CH_2OH$, $CH_2OCH_2CH(OH)CH_2OCH_2CH(OH)CH_2OH$, $CH_2O(CH_2)_gOH$, $CH_2OCH_2CH(OH)CH_2OC_6H_4OC_6H_5$, $CH_2OCH_2CH(OH)CH_2OC_{10}H_7$, $CH_2OCH_2CH(OH)CH_2OC_6H_4-R_5$, $CH_2OCH_2CH(OH)CH_2O(CH_2)_hOC_6H_4-O(CH_2)_hOH$, or $CH_2OCH_2CH(OH)CH_2(OCH_2CH_2)_iOC_6H_4(OCH_2CH_2)_iOH$, $R_5$ is hydrogen, an alkoxy group having 1 to 4 carbon atoms, an amino group, a hydroxyl group, or an amide group, g and i are each independently a real number of 1 to 3, each h is independently a real number of 1 to 6.

[4] A lubricant including the fluoropolyether compound described in any one of [1] to [3].

[5] A magnetic disk including: a recording layer; a protective layer disposed on the recording layer; and a lubricant layer disposed on the protective layer, the lubricant layer containing the lubricant described in [4].

EXAMPLES

The present invention will be described in more detail with reference to examples below. Note, however, the present invention is not limited to the following Examples.

Example 1: Synthesis of $(CF_3CF_2CF_2O(CF_2CF_2CF_2O)_dCF_2CF_2CH_2OCH_2CH(OH)CH_2OC_6H_4)_3CCH_3$ (compound 1, also shown in FIG. 4)

A compound 1 was synthesized as follows. In an argon atmosphere, 16 g of fluoropolyether (number average molecular weight: 1026, molecular weight distribution: 1.24) represented by $CF_3CF_2CF_2O(CF_2CF_2CF_2O)_dCF_2CF_2CH_2OH$ and 0.8 g of a compound (1,1,1-Tris(4-hydroxyphenyl)ethane triglycidyl ether) obtained by epoxidizing 1,1,1-Tris(4-hydroxyphenyl)ethane were stirred for 80 hours at 70° C. in 6.4 g of a t-butyl alcohol solvent and by using 0.1 g of sodium t-butoxide as a catalyst. Subsequently, a reaction product thereby obtained was washed with water, and then dehydrated. The dehydrated reaction product was further purified by distillation. This yielded 3.9 g of the compound 1.

The compound 1 was transparent, pale yellow, and viscous, and had a density of 1.73 g/cm³ at 20° C. Identification results of the compound 1 by NMR are shown below.

$^{19}F$-NMR (solvent: hexafluorobenzene, reference substance: $OCF_2CF_2CF_2O$ in the product [–129.7 ppm].

δ=–129.7ppm[26F,—$OCF_2CF_2CF_2O$—]

δ=–83.7ppm[52F,—$OCF_2CF_2CF_2O$—]

δ=–124.2ppm[6F,—$OCF_2CF_2CH_2OCH_2CH(OH)CH_2O$—]

δ=–86.5ppm[6F,—$OCF_2CF_2CH_2OCH_2CH(OH)CH_2O$—]

δ=–82.4ppm[6F,—$OCF_2CF_2CF_3$]

δ=–130.7ppm[6F,—$OCF_2CF_2CF_3$]

δ=–84.7ppm[6F,—$OCF_2CF_2CF_3$]

The results by $^{19}F$-NMR has shown that the compound 1 has d=4.3.

$^1H$-NMR (solvent: hexafluorobenzene, reference substance: $D_2O$)

δ=4.0ppm to4.9ppm[21H,($CF_3CF_2CF_2O(CF_2CF_2CF_2O)_dCF_2CF_2CH_2OCH_2CH(OH)CH_2OC_6H_4)_3CCH_3$]

δ=6.9ppm to7.6ppm[12H,($CF_3CF_2CF_2O(CF_2CF_2CF_2O)_dCF_2CF_2CH_2OCH_2CH(OH)CH_2OC_6H_4)_3CCH_3$]

δ=2.5ppm[3H,($CF_3CF_2CF_2O(CF_2CF_2CF_2O)_dCF_2CF_2CH_2OCH_2CH(OH)CH_2OC_6H_4)_3CCH_3$]

δ=2.8ppm[3H,($CF_3CF_2CF_2O(CF_2CF_2CF_2O)_dCF_2CF_2CH_2OCH_2CH(OH)CH_2OC_6H_4)_3CCH_3$].

Example 2: Synthesis of $(HOCH_2CH(OH)CH_2OCH_2CF_2O(CF_2CF_2O)_cCF_2CH_2OCH_2CH(OH)CH_2OC_6H_4)_3CH_3$ (compound 2, also shown in FIG. 4)

A compound 2 was synthesized as follows. In an argon atmosphere, 585 g of fluoropolyether (number average molecular weight: 1234, molecular weight distribution: 1.24) represented by $HOCH_2CF_2O(CF_2CF_2O)_cCF_2CH_2OH$ and 74.1 g of glycidol were stirred for 15 hours at 70° C. in 251 g of a t-butyl alcohol solvent and by using 5.2 g of potassium t-butoxide as a catalyst. Subsequently, a reaction product thereby obtained was washed with water, the reaction product having been washed with water was then dehydrated, and the reaction product having been dehydrated was purified by silica gel column chromatography. This yielded 277 g of fluoropolyether (number average molecular weight: 1306) having one hydroxyl group at one terminal thereof and having two hydroxyl groups at the other terminal part. In 39.8 g of a t-butyl alcohol solvent, 92 g of fluoropolyether thereby obtained and 3.6 of the compound (1,1,1-Tris(4-hydroxyphenyl)ethane triglycidyl ether) obtained by epoxidizing 1,1,1-Tris(4-hydroxyphenyl)ethane were stirred for 68 hours at 70° C. by using 0.2 g of sodium t-butoxide added thereto as a catalyst. Subsequently, a reaction product thereby obtained was washed with water, and then dehydrated. The dehydrated reaction product was purified by distillation. This yielded 30 g of the compound 2.

The compound 2 was viscous, and had a density of 1.73 g/cm³ at 20° C. Identification results of the compound 2 by NMR are shown below.

$^{19}$F-NMR (solvent; none, reference substance: OCF$_2$CF$_2$O in the product [−89.1 ppm].

δ=−89.1ppm[113F,—OCF$_2$CF$_2$O—]

δ=−79.0ppm[12F,—OCF$_2$CH$_2$OCH$_2$CH(OH)
CH$_2$O—,—OCF$_2$CH$_2$OCH$_2$CH(OH)CH$_2$OH]

The results by $^{19}$F-NMR has shown that the compound 2 has c=9.4.

$^1$H-NMR (solvent: none, reference substance: D$_2$O)

δ=4.0ppm to 4.9ppm[42H,(HOCH$_2$CH(OH)
CH$_2$OCH$_2$CF$_2$O(CF$_2$CF$_2$O)$_c$CF$_2$CH$_2$OCH$_2$CH
(OH)CH$_2$OC$_6$H$_4$)$_3$CCH$_3$]

δ=6.9ppm to 7.6ppm[12H,(HOCH$_2$CH(OH)
CH$_2$OCH$_2$CF$_2$O(CF$_2$CF$_2$O)$_c$CF$_2$CH$_2$OCH$_2$CH
(OH)CH$_2$OC$_6$H$_4$)$_3$CCH$_3$]

δ=2.5ppm[3H,(HOCH$_2$CH(OH)CH$_2$OCH$_2$CF$_2$O
(CF$_2$CF$_2$O)$_c$CF$_2$CH$_2$OCH$_2$OCH(OH)
CH$_2$OC$_6$H$_4$)$_3$CCH$_3$]

δ=2.8ppm[9H,(HOCH$_2$CH(OH)CH$_2$OCH$_2$CF$_2$O
(CF$_2$CF$_2$O)$_c$CF$_2$CH$_2$OCH$_2$CH(OH)CH$_2$
OC$_6$H$_4$)$_3$CCH$_3$].

Example 3: Synthesis of (HOCH$_2$CH(OH) CH$_2$OCH$_2$CF$_2$CF$_2$O(CF$_2$CF$_2$CF$_2$O)$_d$CF$_2$CF$_2$CH$_2$OCH$_2$CH(OH)CH$_2$OC$_6$H$_4$)$_3$CCH$_3$ (compound 3, also shown in FIG. 4)

In the same manner as in Example 2 except that fluoropolyether represented by HOCH$_2$CF$_2$CF$_2$O (CF$_2$CF$_2$CF$_2$O)$_d$CF$_2$CF$_2$CH$_2$OH was used instead of fluoropolyether represented by HOCH$_2$CF$_2$O(CF$_2$CF$_2$O)$_c$CF$_2$CH$_2$OH used in Example 2, 30 g of a compound 3 was obtained.

The compound 3 was transparent, pale yellow, and viscous, and had a density of 1.73 g/cm$^3$ at 20° C. Identification results of the compound 3 by NMR are shown below.

$^{19}$F-NMR (solvent; none, reference substance: OCF$_2$CF$_2$CF$_2$O in the product [−129.7 ppm].

δ=−129.7ppm[34F,—OCF$_2$CF$_2$CF$_2$O—]

δ=−83.7ppm[67F,—OCF$_2$CF$_2$CF$_2$O—]

δ=−124.2ppm[12F,—OCF$_2$CF$_2$CH$_2$OCH$_2$CH(OH)
CH$_2$O—,—OCF$_2$CF$_2$CH$_2$OCH$_2$CH(OH)
CH$_2$OH]

δ=−86.5ppm[12F,—OCF$_2$CF$_2$CH$_2$OCH$_2$CH(OH)
CH$_2$O—,—OCF$_2$CF$_2$CH$_2$OCH$_2$CH(OH)
CH$_2$OH]

The results by $^{19}$F-NMR has shown that the compound 3 has d=5.6.

$^1$H-NMR (solvent: none, reference substance: D$_2$O)

δ=4.0ppm to 4.9ppm[42H,(HOCH$_2$CH(OH)
CH$_2$OCH$_2$CF$_2$CF$_2$O(CF$_2$CF$_2$CF$_2$O)$_d$
CF$_2$CF$_2$CH$_2$OCH(OH)CH$_2$OC$_6$H$_4$)$_3$CCH$_3$]

δ=6.9ppm to 7.6ppm[12H,(HOCH$_2$CH(OH)
CH$_2$OCH$_2$CF$_2$CF$_2$O(CF$_2$CF$_2$CF$_2$O)$_d$
CF$_2$CF$_2$CH$_2$OCH$_2$CH(OH)CH$_2$OC$_6$H$_4$)$_3$CCH$_3$]

δ=2.5ppm[3H,(HOCH$_2$CH(OH)CH$_2$OCH$_2$CF$_2$CF$_2$O
(CF$_2$CF$_2$CF$_2$O)$_d$CF$_2$CF$_2$CH$_2$OCH$_2$CH(OH)
CH$_2$OC$_6$H$_4$)$_3$CCH$_3$]

δ=2.8ppm[9H,(HOCH$_2$CH(OH)CH$_2$OCH$_2$CF$_2$CF$_2$O
(CF$_2$CF$_2$CF$_2$O)$_d$CF$_2$CF$_2$CH$_2$OCH$_2$CH(OH)
CH$_2$OC$_6$H$_4$)$_3$CCH$_3$].

Example 4: Synthesis of HOCH$_2$CH(OH) CH$_2$OCH$_2$CF$_2$CF$_2$CF$_2$O(CF$_2$CF$_2$CF$_2$CF$_2$O)$_e$CF$_2$CF$_2$CF$_2$CH$_2$OCH$_2$CH(OH)CH$_2$OC$_6$H$_4$)$_3$CCH$_3$ (compound 4, also shown in FIG. 4)

In the same manner as in Example 2 except that fluoropolyether represented by HOCH$_2$CF$_2$CF$_2$CF$_2$O (CF$_2$CF$_2$CF$_2$CF$_2$O)$_e$CF$_2$CF$_2$CF$_2$CH$_2$OH was used instead of fluoropolyether represented by HOCH$_2$CF$_2$O(CF$_2$CF$_2$O)$_c$CF$_2$CH$_2$OH used in Example 2, 33 g of a compound 4 was obtained.

The compound 4 was transparent, pale yellow, and viscous, and had a density of 1.73 g/cm$^3$ at 20° C. Identification results of the compound 4 by NMR are shown below.

$^{19}$F-NMR (solvent; none, reference substance: OCF$_2$CF$_2$CF$_2$CF$_2$O in the product [−125.8 ppm].

δ=−83.7ppm[64F,—OCF$_2$CF$_2$CF$_2$CF$_2$O—,—
OCF$_2$CF$_2$CF$_2$CH$_2$OCH$_2$CH(OH)CH$_2$O—,
OCF$_2$CF$_2$CF$_2$CH$_2$OCH$_2$CH(OH)CH$_2$OH]

δ=−123.3ppm[12F,—OCF$_2$CF$_2$CF$_2$CH$_2$OCH$_2$CH
(OH)CH$_2$O—,—OCF$_2$CF$_2$CF$_2$CH$_2$OCH$_2$CH
(OH)CH$_2$OH]

δ=−125.8ppm[52F,—OCF$_2$CF$_2$CF$_2$CF$_2$O—]

δ=−127.6ppm[12F,—OCF$_2$CF$_2$CF$_2$CH$_2$OCH$_2$CH
(OH)CH$_2$O—,—OCF$_2$CF$_2$CF$_2$CH$_2$OCH$_2$CH
(OH)CH$_2$OH]

The results by $^{19}$F-NMR has shown that the compound 4 has e=4.3.

$^1$H-NMR (solvent: none, reference substance: D$_2$O)

δ=4.0ppm to 4.9ppm[42H,(HOCH$_2$CH(OH)
CH$_2$OCH$_2$CF$_2$CF$_2$CF$_2$O(CF$_2$CF$_2$CF$_2$CF$_2$
O)$_e$CF$_2$CF$_2$CF$_2$CH$_2$OCH$_2$CH(OH)CH$_2$
OC$_6$H$_4$)$_3$CCH$_3$]

δ=6.9ppm to 7.6ppm[12H,(HOCH$_2$CH(OH)
CH$_2$OCH$_2$CF$_2$CF$_2$CF$_2$O(CF$_2$CF$_2$CF$_2$
CF$_2$O)$_e$CF$_2$CF$_2$CF$_2$CH$_2$O CH$_2$CH(OH)
CH$_2$OC$_6$H$_4$)$_3$CCH$_3$]

δ=2.5ppm[3H,(HOCH$_2$CH(OH)
CH$_2$OCH$_2$CF$_2$CF$_2$CF$_2$O(CF$_2$CF$_2$CF$_2$
CF$_2$O)$_e$CF$_2$CF$_2$CF$_2$CH$_2$OCH$_2$CH(OH)
CH$_2$OC$_6$H$_4$)$_3$CCH$_3$]

δ=2.8ppm[9H,(HOCH$_2$CH(OH)
CH$_2$OCH$_2$CF$_2$CF$_2$CF$_2$O(CF$_2$CF$_2$CF$_2$
CF$_2$O)$_e$CF$_2$CF$_2$CF$_2$CH$_2$OCH$_2$CH(OH)
CH$_2$OC$_6$H$_4$)$_3$CCH$_3$].

Example 5: Synthesis of (CH$_3$OC$_6$H$_4$OCH$_2$CH(OH) CH$_2$OCH$_2$CF$_2$O(CF$_2$CF$_2$O)$_c$CF$_2$CH$_2$OC H$_2$CH(OH) CH$_2$OC$_6$H$_4$)$_3$CCH$_3$ (compound 5, also shown in FIG. 4)

In the same manner as in Example 2 except that the compound represented by (c-3-1) described above was used instead of glycidol used in Example 2, 40 g of a compound 5 was obtained. The compound 5 was a waxy, white solid, and had a density of 1.76 g/cm$^3$ at 20° C. Identification results of the compound 5 by NMR are shown below.

$^{19}$F-NMR (solvent; none, reference substance: OCF$_2$CF$_2$O in the product [−89.1 ppm].

δ=−89.1ppm[108F,—OCF$_2$CF$_2$O—]

δ=−79.0ppm[12F,—OCF$_2$CH$_2$OCH$_2$CH(OH)
CH$_2$O—,—OCF$_2$CH$_2$OCH$_2$CH(OH)
CH$_2$OC$_6$H$_4$OCH$_3$]

The results by $^{19}$F-NMR has shown that the compound 5 has c=9.0.

$^{1}$H-NMR (solvent: none, reference substance: D$_2$O)

δ=4.0ppm to4.9ppm[51H,(CH$_3$OC$_6$H$_4$OCH$_2$CH(OH)
CH$_2$OCH$_2$CF$_2$O(CF$_2$CF$_2$O)$_c$CF$_2$CH$_2$OC H$_2$CH
(OH)CH$_2$OC$_6$H$_4$)$_3$CCH$_3$]

δ=6.5ppm to7.6ppm[24H,(CH$_3$C$_6$H$_4$OCH$_2$CH(OH)
CH$_2$OCH$_2$CF$_2$O(CF$_2$CF$_2$O)$_c$CF$_2$CH$_2$OCH$_2$CH
(OH)CH$_2$OC$_6$H$_4$)$_3$CCH$_3$]

δ=2.5ppm[3H,(CH$_3$C$_6$H$_4$OCH$_2$CH(OH)
CH$_2$OCH$_2$CF$_2$O(CF$_2$CF$_2$O)$_c$CF$_2$CH$_2$OCH$_2$CH
(OH)CH$_2$OC$_6$H$_4$)$_3$CCH$_3$]

δ=2.8ppm[6H,(CH$_3$C$_6$H$_4$OCH$_2$CH(OH)
CH$_2$OCH$_2$CF$_2$O(CF$_2$CF$_2$O)$_c$CF$_2$CH$_2$OCH$_2$CH
(OH)CH$_2$OC$_6$H$_4$)$_3$CCH$_3$].

Example 6: Synthesis of (HOCH$_2$CH$_2$OC$_6$H$_4$OCH$_2$CH$_2$OCH$_2$CH(OH)CH$_2$OCH$_2$CF$_2$O(CF$_2$C F$_2$O)$_c$CF$_2$CH$_2$OCH$_2$CH(OH)CH$_2$OC$_6$H$_4$)$_3$CCH$_3$ (compound 6, also shown in FIG. 4)

In the same manner as in Example 2 except that the compound represented by (c-3-4) described above was used instead of glycidol used in Example 2, 46 g of the compound 6 was obtained. The compound 6 was a waxy, white solid, and had a density of 1.76 g/cm$^3$ at 20° C. Identification results of the compound 6 by NMR are shown below.

$^{19}$F-NMR (solvent; none, reference substance: OCF$_2$CF$_2$O in the product [−89.1 ppm].

δ=−89.1ppm[104F,—OCF$_2$CF$_2$O—]

δ=−79.0ppm[12F,—OCF$_2$CH$_2$OCH$_2$CH(OH)
CH$_2$O—,—OCF$_2$CH$_2$OCH$_2$CH(OH)
CH$_2$OCH$_2$CH$_2$OC$_6$H$_4$OCH$_2$CH$_2$OH]

The results by $^{19}$F-NMR has shown that the compound 6 has c=8.7.

$^{1}$H-NMR (solvent: none, reference substance: D$_2$O)

δ=3.5ppm to4.9ppm[66H,
(HOCH$_2$CH$_2$OC$_6$H$_4$OCH$_2$CH$_2$OCH$_2$CH(OH)
CH$_2$OCH$_2$CF$_2$O(CF$_2$C F$_2$O)$_c$CF$_2$CH$_2$OCH$_2$
(OH)CH$_2$OC$_6$H$_4$)$_3$CCH$_3$]

δ=6.5ppm to7.6ppm[24H,
(HOCH$_2$CH$_2$OC$_6$H$_4$OCH$_2$CH$_2$OCH$_2$CH(OH)
CH$_2$OCH$_2$CF$_2$O(CF$_2$C F$_2$O)$_c$CF$_2$CH$_2$OCH$_2$
(OH)CH$_2$OC$_6$H$_4$)$_3$CCH$_3$]

δ=2.5ppm[3H,
(HOCH$_2$CH$_2$OC$_6$H$_4$OCH$_2$CH$_2$OCH$_2$CH(OH)
CH$_2$OCH$_2$CF$_2$O(CF$_2$C F$_2$O)$_c$CF$_2$CH$_2$OCH$_2$
(OH)CH$_2$OC$_6$H$_4$)$_3$CCH$_3$]

δ=2.8ppm[9H,
(HOCH$_2$CH$_2$OC$_6$H$_4$OCH$_2$CH$_2$OCH$_2$CH(OH)
CH$_2$OCH$_2$CF$_2$O(CF$_2$C F$_2$O)$_c$CF$_2$CH$_2$OCH$_2$
(OH)CH$_2$OC$_6$H$_4$)$_3$CCH$_3$].

Comparative Examples 1 to 3

Used for comparison were a lubricant 7 (Comparative Example 1), a lubricant 8 (Comparative Example 2), and a lubricant 9 (Comparative Example 3) each of which had a central skeleton including three aromatic rings bound together via a tertiary carbon atom. The structures of compounds used as the lubricants 7, 8, and 9 are as follows. The lubricant 8 (Comparative Example 2) and the lubricant 9 (Comparative Example 3) had an alkoxy group at three terminals in each of the lubricants.

(CF$_3$CF$_2$CF$_2$O(CF$_2$CF$_2$CF$_2$O)$_d$CF$_2$CF$_2$CH$_2$OCH$_2$CH
(OH)C H$_2$OC$_6$H$_4$)$_3$CH    Lubricant 7

In the formula, d=5.8.

(HOCH$_2$CH(OH)CH$_2$OCH$_2$CF$_2$CF$_2$O(CF$_2$CF$_2$CF$_2$O)
$_d$CF$_2$CF$_2$CH$_2$OCH$_2$CH(OH)CH$_2$OC$_6$H$_4$)$_3$CH    Lubricant 8

In the formula, d=4.6.

(HOCH$_2$CF$_2$O(CF$_2$O)$_b$(CF$_2$CF$_2$O)$_c$CF$_2$CH$_2$OCH$_2$CH
(OH)C H$_2$OC$_6$H$_4$)$_3$CH    Lubricant 9

In the formula, b=4.5 and c=5.4.

Heat Resistance Evaluation

Each of the compounds obtained in Examples and Comparative Examples was taken out in an amount of 5 mg and put in a platinum sample pan for thermogravimetric measurement. The measurement was carried out in a nitrogen atmosphere by increasing temperature from 30° C. to 550° C. at a temperature increase rate of 2° C./min. For comparison of heat resistance, temperature was read as of the point in time when the weight of the compound is reduced by 10%.

Measurement results of the temperature read, as of the point in time when the weight of the compound is reduced by 10% (10% thermogravimetric weight loss temperature) are listed in Table 1 below.

TABLE 1

|  | Lubricant | 10% thermogravimetric weight loss temperature |
|---|---|---|
| Examples | Compound 1 | 341° C. |
|  | Compound 2 | 333° C. |
|  | Compound 3 | 338° C. |
|  | Compound 4 | 335° C. |
|  | Compound 5 | 358° C. |
|  | Compound 6 | 370° C. |
| Comparative Examples | Lubricant 7 | 314° C. |
|  | Lubricant 8 | 306° C. |
|  | Lubricant 9 | 303° C. |

As shown in Table 1, the compounds 1 to 6 obtained in Examples 1 to 6 in which used was a linking group having a structure in which an alkyl group is bound to a tertiary carbon atom adjacent to benzene rings are higher in temperature as of a 10% thermogravimetric weight loss and therefore more excellent in heat resistance than the lubricants in Comparative Examples in which used was a trivalent linking group containing a structure in which three benzene rings and a hydrogen atom are bound to a carbon atom.

INDUSTRIAL APPLICABILITY

The fluoropolyether compound in accordance with an aspect of the present invention can suitably be used as a lubricant for magnetic disks.

REFERENCE SIGNS LIST

1: Magnetic disk
2: Lubricant layer
3: Protective film layer (protective layer)
4: Recording layer
5: Lower layer
6: Soft magnetic lower layer
7: Adhesive layer
8: Non-magnetic substrate

The invention claimed is:

1. A fluoropolyether compound represented by a Formula below:

where $R_1$ is a saturated hydrocarbon group having 1 to 3 carbon atoms, a perfluoroalkyl group having 1 to 3 carbon atoms, an alkoxy group having 1 to 3 carbon atoms, a hydroxyl group, or an amino group, and $A_1$, $A_2$, and $A_3$ are each independently a phenylene group, a naphthylene group, a biphenyl group, or a diphenyl ether group, and each $-(CF_2)_a-$ is independently a linear of branched perfluoroalkylene group, each a is independently a real number of 1 to 3, and

Rf is represented by Formula (4) below:

where b, c, d, e, and f are independently real numbers of 0 to 21 for each Rf, and at least any one of b, c, d, e, and f is a real number of not less than 1, $R_2$, $R_3$, and $R_4$ are each independently F, $CH_2OH$, $CH_2OCH_2CH(OH)CH_2OH$, $CH_2OCH_2CH(OH)CH_2OCH_2CH(OH)CH_2OH$, $CH_2O(CH_2)_gOH$, $CH_2OCH_2CH(OH)CH_2OC_6H_4OC_6H_5$, $CH_2OCH_2CH(OH)CH_2OC_{10}H_7$, $CH_2OCH_2CH(OH)CH_2OC_6H_4-R_5$, $CH_2OCH_2CH(OH)CH_2O(CH_2)_hOC_6H_4-O(CH_2)_hOH$, or $CH_2OCH_2CH(OH)CH_2(OCH_2CH_2)_iOC_6H_4(OCH_2CH_2)_iOH$, $R_5$ is hydrogen, and alkoxy group having 1 to 4 carbon atoms, an amino group, a hydroxyl group, or an amide group, g and i are each independently a real number of 1 to 3, and each h is independently a real number of 1 to 6.

2. The fluoropolyether compound according to claim 1, wherein the fluoropolyether compound is represented by Formula (3) below:

(3)

3. A lubricant comprising the fluoropolyether compound according to claim 1.

4. A magnetic disk comprising: a recording layer; a protective layer disposed on the recording layer; and a lubricant layer disposed on the protective layer, the lubricant layer containing the lubricant according to claim 3.

* * * * *